(12) United States Patent
Manepalli et al.

(10) Patent No.: US 10,560,845 B1
(45) Date of Patent: Feb. 11, 2020

(54) USING A CHANGE IN INFORMATION AND CELLULAR ACCOUNT ATTRIBUTES ASSOCIATED WITH A MOBILE DEVICE NETWORK ID AS RISK INDICATORS IN MOBILE NETWORK-BASED AUTHENTICATION

(71) Applicant: ZUMIGO, INC., San Jose, CA (US)

(72) Inventors: Harish Manepalli, San Jose, CA (US); Chirag C. Bakshi, San Jose, CA (US); Venkatarama Parimi, Dublin, CA (US); Lyndi Rebecca Long, Plant City, FL (US)

(73) Assignee: ZUMIGO, INC., San Jose, CA (US)

( * ) Notice: Subject to any disclaimer, the term of this patent is extended or adjusted under 35 U.S.C. 154(b) by 0 days.

(21) Appl. No.: 16/442,327

(22) Filed: Jun. 14, 2019

Related U.S. Application Data

(63) Continuation-in-part of application No. 16/216,637, filed on Dec. 11, 2018.

(51) Int. Cl.
*H04M 1/66* (2006.01)
*H04W 12/06* (2009.01)
(Continued)

(52) U.S. Cl.
CPC .......... *H04W 12/06* (2013.01); *H04L 63/08* (2013.01); *H04L 63/10* (2013.01); *H04L 63/205* (2013.01); *H04W 48/02* (2013.01); *H04W 60/00* (2013.01)

(58) Field of Classification Search
CPC ..... H04W 12/06; H04W 48/02; H04W 60/00; H04L 63/08; H04L 63/10; H04L 9/32; H04L 63/0846; H04L 63/0823; H04L 2463/102; H04L 67/02; H04L 69/329; H04L 63/083; H04L 2463/082; H04L 63/0855; Y10S 707/99931;
(Continued)

(56) References Cited

U.S. PATENT DOCUMENTS 7,298,327 B2 * 11/2007 Dupray ................... G01S 1/026
342/451
7,373,515 B2 * 5/2008 Owen ..................... G06F 21/31
713/182
(Continued)

OTHER PUBLICATIONS

Marforio et al. "Smartphones as Practical and Secure Location Verification Tokens for Payments," NDSS 2014, Feb. 22, 2014, 15 pages.

*Primary Examiner* — Mahendra R Patel
(74) *Attorney, Agent, or Firm* — Kim & Stewart LLP (57) ABSTRACT

The network ID of a mobile device can be securely employed as a possession factor or as an identifier of a mobile device that is authorized to receive a funds transfer. When an access to a restricted access application server or a restricted access account on the application server is attempted via a computing device, and possession of a mobile device programmed with a network ID is employed as a verification factor, the application server or a risk indicator server can determine whether certain changes in information associated with the network ID and one or more attributes of a cellular account associated with the network ID are risk indicators. Based on the presence or absence of such risk indicators associated with the network ID, the user activity is either authorized or denied.

19 Claims, 6 Drawing Sheets

(51) Int. Cl.
*H04L 29/06* (2006.01)
*H04W 60/00* (2009.01)
*H04W 48/02* (2009.01)

(58) Field of Classification Search
CPC ............ Y10S 707/99939; G06F 21/31; G06Q 20/102; G06Q 30/06; G06Q 20/4016; G06Q 40/04; G06Q 40/025
USPC ................................ 455/411, 456.2; 705/76
See application file for complete search history.

(56) References Cited

U.S. PATENT DOCUMENTS

| | | | | |
|---|---|---|---|---|
| 7,640,574 B1 * | 12/2009 | Kim | ........................ | G06F 21/31 726/1 |
| 8,020,763 B1 * | 9/2011 | Kowalchyk | .......... | G06Q 20/102 235/380 |
| 2001/0037451 A1 * | 11/2001 | Bhagavatula | ......... | G06F 21/445 713/155 |
| 2002/0091745 A1 * | 7/2002 | Ramamurthy | .......... | G06F 21/62 718/100 |
| 2005/0268107 A1 * | 12/2005 | Harris | ...................... | G06F 21/31 713/182 |
| 2006/0070125 A1 * | 3/2006 | Pritchard | ................ | G06F 21/31 726/18 |
| 2006/0136740 A1 * | 6/2006 | Smith | ...................... | G06F 21/31 713/184 |
| 2007/0033649 A1 * | 2/2007 | Henriksen | ................ | G06F 21/34 726/20 |
| 2011/0165892 A1 * | 7/2011 | Ristich | .................. | H04W 64/00 455/456.2 |
| 2011/0231914 A1 * | 9/2011 | Hung | .................... | G06F 21/335 726/7 |
| 2018/0166176 A1 * | 6/2018 | Flippen | ................. | A61B 5/7465 |
| 2019/0139024 A1 * | 5/2019 | Bakshi | ............... | G06Q 20/3224 |

\* cited by examiner

| Network ID 201 | Cellular Account 202 | Account Tenure 203 | Payment Status 204 | Account Payment Type 205 | Pre-Paid Transition Status 206 | Call Forwarding Activation 207 | Call Forwarding Recency 208 | Network ID Porting Status 209 |
|---|---|---|---|---|---|---|---|---|
| XXX-YYY-ZZZ1 | 236-254 | 34 days | Late | Pre-Paid | 2019.04.08 | N/A | N/A | 2019.04.08 |
| XXX-YYY-ZZZ2 | 158-358 | 1 days | OK | Billed | N/A | N/A | N/A | N/A |
| XXX-YYY-ZZZ3 | 115-842 | 255 days | OK | Billed | N/A | N/A | N/A | N/A |
| XXX-YYY-ZZZ4 | 28-863 | 377 days | OK | Billed | N/A | YES | 2019.03.15 | N/A |
| XXX-YYY-ZZZ5 | 587-984 | 653 days | Late | Billed | N/A | N/A | N/A | N/A |
| XXX-YYY-ZZZ6 | 222-357 | 568 days | OK | Pre-Paid | 2018.09.02 | N/A | N/A | N/A |
| XXX-YYY-ZZZ7 | 236-254 | 45 days | Collections | Billed | N/A | N/A | N/A | 2019.04.11 |
| XXX-YYY-ZZZ8 | 245-358 | 234 days | Late | Billed | N/A | YES | 2019.09.02 | 2017.09.02 |
| XXX-YYY-ZZZ9 | 257-355 | 0 days | OK | Pre-Paid | 2019.04.11 | YES | 2019.04.11 | 2019.04.11 |
| XXX-YYY-ZZ10 | 287-254 | 3 days | OK | Billed | N/A | N/A | N/A | N/A |
| XXX-YYY-ZZ11 | 891-358 | 0 days | OK | Pre-Paid | 2019.04.11 | N/A | N/A | N/A |

| NETWORK ID 201 | USER NAME 302 | ACTIVATION DATE 303 | USER ADDRESS 304 | ACTIVATION DATE 305 | OTHER INFO. 306 | ACTIVATION DATE 307 | VERIFICATION QUERY DATE 308 |
|---|---|---|---|---|---|---|---|
| XXX-YYY-ZZZ1 | Darrel Johnson | 2018.08.31 | 1535 Monroe St | 2018.08.31 | 0235-123669 | 2018.08.31 | 2018.08.31 |
| | Susan McAbe | 2018.08.31 | 120 S. Bowers | 2018.08.31 | 1434-763344 | 2018.08.31 | 2018.08.31 |
| | Donald Johnson | 2018.08.31 | 3355 Walsh Ave | 2018.08.31 | 5490-003427 | 2018.08.31 | 2018.08.31 |
| | Richard Smith | 2018.09.01 | 5655 22$^{nd}$ Ave | 2018.09.01 | 0144-274503 | 2018.09.01 | 2018.09.01 |
| | Barbara Jones | 2018.09.02 | 705 Main St. | 2018.09.02 | 5490-600342 | 2018.09.02 | 2018.09.01 |
| | | | | | | | 2018.09.02 |
| | | | | | | | 2018.09.02 |
| | | | | | | | 2018.09.02 |
| XXX-YYY-ZZZ2 | Randal Swain | 2015.04.15 | 110 25$^{th}$ Ave. | 2016.04.15 | 0010-076658 | 2016.04.15 | 2018.07.20 |
| | | | 222 Main St. | 2016.01.20 | | | 2018.08.02 |
| | | | 123 Park Ave. | 2017.02.02 | | | 2018.08.31 |
| | | | 2535 Palmdale | 2017.09.08 | | | 2018.09.02 |
| | | | 603 S. 240$^{th}$ St. | 2018.04.21 | | | |
| XXX-YYY-ZZZ3 | Mehdi Abed | 2018.09.02 | 7252 26$^{th}$ Ave N | 2018.09.02 | 4503-005490 | 2018.09.02 | |
| | Fei Zhang | 2018.09.03 | 455 Red Ln. | 2018.09.02 | 0214-274503 | 2018.09.02 | |
| | Hans Schwartz | 2018.09.03 | 255 Main St. | 2018.09.02 | 3350-450342 | 2018.09.02 | |

USING A CHANGE IN INFORMATION AND CELLULAR ACCOUNT ATTRIBUTES ASSOCIATED WITH A MOBILE DEVICE NETWORK ID AS RISK INDICATORS IN MOBILE NETWORK-BASED AUTHENTICATION

CROSS-REFERENCE TO RELATED APPLICATION(S)

This application is a continuation-in-part of U.S. patent application Ser. No. 16/216,637, filed Dec. 11, 2018, the entire contents of which are incorporated by reference herein.

BACKGROUND OF THE INVENTION

Field of the Invention

Embodiments of the present invention generally relate to wireless telecommunication systems and, more specifically, to systems and methods for using a change in information and cellular account attributes associated with a mobile device network ID as risk indicators in mobile network-based authentication.

Description of the Related Art

It has become common practice for possession of a mobile device to be employed as an authentication factor for login to an account or website associated with sensitive information. For example, when logging in to a bank account or transferring funds from the bank account via an application on a mobile device, a user may be required to confirm possession of an authorized mobile device that is linked to the bank account. In some instances, possession of the authorized mobile device is verified when the user enters a one-time password (OTP) that is sent via text message to the authorized mobile device. Alternatively, when a user attempts to access a bank account via a mobile device, access may be restricted to the authorized mobile device that is linked to the bank account. In such instances, technologies are employed that determine the mobile number of the mobile device interacting with an application or website, and report that mobile number to the bank. Thus, the bank can confirm that the bank account is being accessed by the authorized mobile device.

However, if a fraudster can obtain access to a victim's bank account, such as by learning or guessing the account password, or by intercepting an OTP that enables a password reset, possession of a mobile device that is linked to the bank account can be defeated as an authentication factor. For example, the fraudster with access to the victim's bank account can transfer funds directly from the compromised account using a conventional person-to-person app by opening a mobile account for a pre-paid cell phone in the victim's name and adding the pre-paid cell phone number to the authorized mobile devices that are associated with the compromised account. This approach can succeed because conventional authorization technologies that can verify the user name associated with a particular mobile device will detect that the victim's name is associated with the pre-paid cell phone performing the sensitive transaction, and therefore authorize it. In this way, a fraudster can remove funds from a compromised bank account without the need for falsified personal identification or the risk of physically entering a bank.

SUMMARY OF THE INVENTION

According to one or more embodiments, changes in information associated with a particular mobile telephone number ("mobile number") or network identification (ID) is tracked to facilitate detection of risk indicators associated with the mobile number by an application server or other authentication entity. In addition, one or more attributes of a cellular account associated with the network ID are reviewed for risk indicators associated with the cellular account. Thus, when access to a secure account that is linked to a network ID is requested from a computing device, certain risk indicators can be determined based on changes in information associated with the network ID and on the one or more attributes of the cellular account associated with the network ID. As a result, fraudulent activity associated with the network ID can be detected, and use of the network ID as an indicator of possession of a particular mobile device is more secure. Further, when a mobile device that is programmed with the network ID is employed in a sensitive transaction that requires authorization, the transaction can be denied in light of certain risk indicators associated with the network ID. For example, detection of certain risk indicators can result in denial of fund transfers that employ the mobile device programmed with the network ID.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

According to various embodiments described herein, when a sensitive transaction is attempted with a secure account that is linked to a particular mobile telephone number ("mobile number") or network identification (ID), certain risk indicators can be determined for generating a risk score for the sensitive transaction. For example, when an authentication factor for accessing the secure account is possession of the mobile device currently programmed with the network ID, a risk score is generated based on 1) changes in information associated with the network ID and 2) attributes of a cellular account associated with the network ID. In another example, when a mobile device currently programmed with the network ID that is linked to the secure account is employed to receive a transfer of funds from the secure account, a risk score for the network ID is generated based on 1) changes in information associated with the network ID and 2) attributes of a cellular account associated with the network ID. As a result, fraudulent activity associated with the network ID for a mobile device can be detected, and use of the network ID is therefore more secure, either as an indicator of possession of a particular mobile device or as an identifier of a mobile device that can be employed in transfers of funds or other sensitive transactions.

Examples of changes in information associated with a network ID that is linked to a secure account include a change in a user name for a mobile account associated with the network ID, a change in an address for a mobile account associated with the network ID, a change in a number of identity verification queries that have been performed with respect to the network ID, and the like. Such changes in information generally occur prior to fraudulent activity, therefore the occurrence of these changes shortly before a sensitive transaction is attempted by a mobile device programmed with the network ID can be considered an authentication risk factor.

Examples of attributes of the cellular account through which wireless services for a network ID are currently provided include how recently the cellular account was opened, whether payments for the cellular account are currently in arrears, whether the cellular account is a prepaid account, whether call-forwarding has been activated on the cellular account, whether the network ID has been ported from a different cellular account or cellular provider, and the like. Because such attributes are sometimes associated with a cellular account linked to fraudulent activity, the detection of one or more such attributes of a cellular account through which wireless services for the network ID are currently provided can be considered a risk factor.

Figure 1:
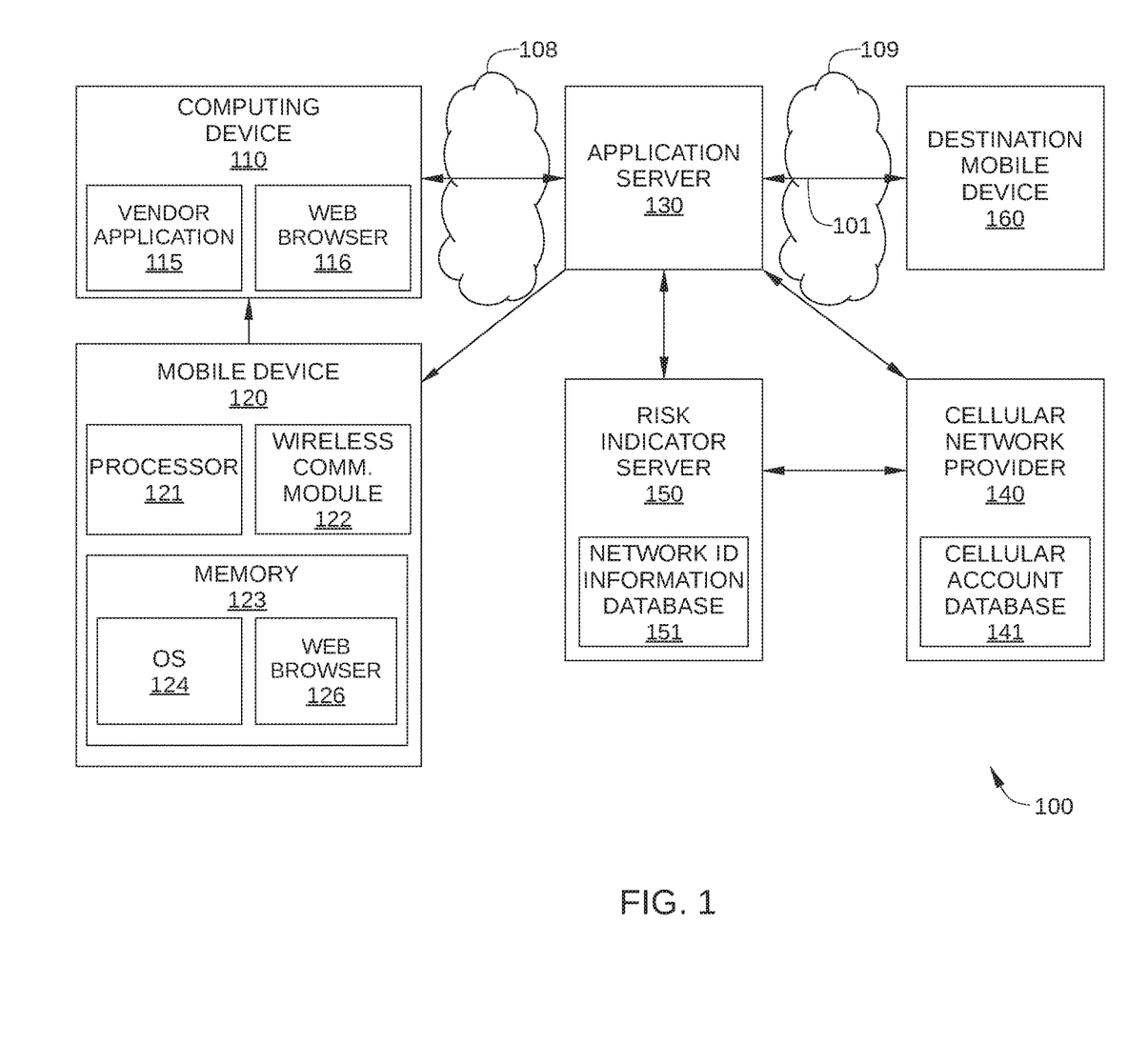
FIG. 1 is a block diagram of a mobile identity verification system, according to one or more embodiments of the present invention.

FIG. 1 is a block diagram of a mobile identity verification system 100, according to one or more embodiments of the present invention. As described below, mobile identity verification system 100 enables changes in information associated with a network ID and/or attributes of a cellular account through which wireless services for a network ID are currently provided to be used as risk indicators in mobile network-based authentication. Consequently, the security of using the mobile number as an authentication factor is enhanced. In addition, the security of using a mobile device programmed with the network ID for performing sensitive transactions, such as receiving a fund transfer from a secure account, is also enhanced. Thus, detected changes in information associated with a network ID informs an application server or other authentication entity that the network ID may be employed in a fraudulent attempt to initiate a user activity associated with a restricted-access account, such as transferring funds from a victim's bank account.

For example, in some embodiments, a user initiates a user activity with a computing device, such as logging in to a secure account associated with an application server, or initiating a person-to-person transfer of funds from such a secure account. In such embodiments, possession of a mobile device programmed with a network ID is employed as a verification factor for authorization of the user activity being initiated. In such embodiments, the application server enables access to the secure account or otherwise authorizes the user activity based on whether changes in certain information associated with the network ID of the mobile device have occurred within a predetermined time interval and on attributes of a cellular account associated with the network ID.

Mobile identity verification system 100 includes a computing device 110, a mobile device 120 (such as a cellular telephone or smartphone), an application server 130, a cellular network provider 140, a risk indicator server 150, and, in some embodiments, a destination mobile device 160. Computing device 110 is communicatively coupled to application server 130 by at least a wireless communication network 108 and application server 130 is communicatively coupled to destination mobile device 160 by at least a wireless communication network 109. Wireless communication network 108 and wireless communication network 109 can each include a wireless local area network (WLAN), a cellular network, or a combination of both. Furthermore, while computing device 110 is shown in FIG. 1 to be communicatively coupled to application server 130 by wireless communication network 108 and application server 130 is shown in FIG. 1 to be communicatively coupled to destination mobile device 160 by wireless communication network 109, in other embodiments, one or more additional communication networks may also be employed to communicatively couple computing device 110, mobile device 120, application server 130, and destination mobile device 160, such as the Internet, among others.

The WLAN included in wireless communication network 108 and/or wireless communication network 109 enables compatible devices to connect to the Internet via a wireless access point, or "hotspot." For example, in some embodiments, the WLAN is a WiFi network that includes one or more devices based on the Institute of Electrical and Electronics Engineers (IEEE) 802.11 standard. Thus, any suitably configured wireless communication device that can connect to the WLAN, such as a smartphone with WiFi capability, can perform data transfer to and from the Internet. The cellular network included in wireless communication network 108 and/or wireless communication network 109 enables two-way wireless communication with wireless subscriber terminals, such as mobile device 120 or destination mobile device 160. For example, in some embodiments, the cellular network includes one or more base stations (not shown) that are in two-way wireless communication with wireless subscriber terminals, and with a landline system (not shown), such as the public switched telephone network (PSTN) or any other wired network capable of voice/data connections. When an active call associated with mobile device 120 or destination mobile device 160 is underway in the cellular network, a suitable base station translates a forward trunk signal in the landline system to a properly formatted radio signal, which is transmitted by an antenna to mobile device 120 over an air interface. Mobile device 120 or destination mobile device 160 then performs complementary operations to enable the two-way voice or data traffic over the air interface.

Computing device 110 can be any technically feasible and network-connected computing device. For example, computing device 110 can be a desktop computer, laptop computer, smartphone, personal digital assistant (PDA), tablet computer, or any other type of computing device that is configured to receive input, process data, and display images, and is suitable for practicing one or more embodiments of the present invention. Thus, computing device 110 is configured to execute a vendor application 115, a web browser 116, and/or other software applications. In addition, computing device 110 is configured to communicate with application server 130, for example via web browser 116.

Vendor application 115 is a computer program designed to run on computing device 110. Vendor application 115 is installed and executed in computing device 110 to facilitate interactions with a particular website, such as application server 130, a particular database, or some other computing device. For example, in some embodiments, vendor application 115 is a banking application, a navigational program, an application that facilitates online purchasing of entertainment media from a specific website, etc.

Mobile device 120 can be a cellular telephone (also referred to as a wireless subscriber terminal), a smart phone, a personal digital assistant (PDA), a tablet computer, or any other mobile computing device configured to wirelessly access wireless communication network 108, and to practice one or more embodiments of the present invention. To that end, in some embodiments, mobile device 120 includes a processor 121, a wireless communication module 122, and a memory 123. Processor 121 may be any suitable processing unit implemented as a central processing unit (CPU), an application-specific integrated circuit (ASIC), a field programmable gate array (FPGA), any other type of processing unit, or a combination of different processing units. Wireless communication module 122 may be any suitable electronics package and or chipset configured to enable wireless communication with wireless communication network 108. Thus, in some embodiments, wireless communication module 122 includes cellular capability and WiFi capability, among others. Alternatively or additionally, in some embodiments, wireless communication module 122 includes Bluetooth capability. Memory 123 can include any suitable volatile and/or nonvolatile memory (e.g., random-access memory (RAM), read-only memory (ROM), flash memory, a magnetic hard drive, etc.), and is configured to store instructions, data, an operating system (OS) 124, and/or a web browser 126, etc.

OS 124 supports the functions of processor 121, including scheduling tasks and sending commands to vendor application 125, memory 123, and wireless module 122, managing the power state of mobile device 120, initiating execution of applications on processor 121, managing sockets and TCP connections, and the like. For example, in some embodiments, OS 124 is configured to facilitate the execution of web browser 126 and/or other software applications. In some embodiments, computing device 110 and mobile device 130 can be the same computing device. In such embodiments, mobile device 120 can be used to initiate a sensitive transaction with application server 130, and possession of mobile device 120 can be used as an authentication factor for the sensitive transaction.

Application server 130 can be any entity that can be accessed by mobile device 120 via a WiFi network and can benefit from identification and/or authorization of a user prior to access by the user. More specifically, application server 130 can be any entity that provides access to a vendor website or to sensitive information. Alternatively or additionally, application server 130 enables important data and/or or financial transactions. Application server 130 can be implemented as a website, an application, a server, a database, an application running on an instance of virtual machine, and the like. Thus, in some embodiments, application server 130 is a public or open server, whereas in other embodiments, application server 130 is a restricted access only server. For example, in some embodiments, application server 130 can be a restricted access server, a merchant server, a vendor website, an e-mail server or application that enables interaction with an e-mail server, a banking website, a cloud storage server, and the like. Thus, the restricted access server can be any computing device, application, or other entity that can be accessed by computing device 110 via vendor application 115 or web browser 116. As noted above, vendor application 115 is configured to facilitate access to and interactions with application server 130, such as banking transactions and person-to-person fund transfers from a bank account associated with application server 130 to a user of destination mobile device 160.

Application server 130 stores and/or provides access to sensitive information and/or enables important data and/or financial transactions. As such, interactions with application server 130, particularly online interactions, generally require authentication, and can require two-factor authentication. For instance, in some embodiments, a knowledge factor (for example a user-entered personal identification number or passcode) and a possession factor (for example possession of mobile device 120) are employed by application server 130 to approve user access to application server 130 via computing device 110 or to initiate a sensitive transaction with computing device 110, such as a person-to-person fund transfer. That is, user access to application server 130 via computing device 110 is not approved unless a two-factor authentication process is successfully completed in which a knowledge factor and a possession factor are verified. For example, suitable knowledge factors include a user-entered personal identification number (PIN) or passcode/password. A suitable possession factor is possession of mobile device 120, where possession is indicated by electronic confirmation that the network ID programmed on the mobile device 120 performing the current interaction with application server 130 corresponds to a phone number associated with the account being accessed on application server 130. Further, according to various embodiments described herein, the authentication process is not completed when certain information associated with the network ID programmed on the mobile device 120 is determined to have been changed during a predetermined time interval and/or a cellular account associated with the network ID is determined to have certain attributes that may indicate fraudulent activity.

According to various embodiments, an authorization process determines a risk score based on one or more risk indicators associated with a network ID linked to a secure account, such as a bank account or e-mail account. The authorization process is successfully completed when the risk score that is based on the risk indicators is less than a certain risk threshold. As noted above, the risk indicators include one or more changes in information associated with the network ID and/or at least one attribute of a cellular account associated with the network ID. The changes in information associated with a network ID can indicate that the network ID is being employed fraudulently, while the one or more account attributes can further indicate potentially fraudulent activity associated with the cellular account through which wireless services for the network ID are currently provided. Upon successful completion of the authorization process, the network ID can then be employed as a possession factor for authorizing access to the secure account, or as an identifier for a mobile device that is authorized to receive fund transfer information, such as a fund transfer notification.

In some embodiments, the above-described authorization process is performed by application server 130. Alternatively, in some embodiments, the above-described authorization process is performed by an external authorization entity (not shown in FIG. 1). The external authorization entity may be, for example, an application that runs on a server or other computing device that is coupled to the Internet (or to another communications network).

Cellular network provider 140 represents one or more computing devices or servers included in cellular network 102 that are employed by the provider of cellular network 102 for communicating control, status, and signaling information between nodes in cellular network 102. In some embodiments, cellular network provider 140 is included in a Signaling System 7 (SS7) network. In some embodiments, cellular network provider 140 includes the capability of cellular network 102 to allocate Internet protocol (IP) addresses to mobile devices 120 and to map currently allocated IP addresses to the mobile numbers of mobile devices 120. In addition, cellular network provider 140 includes a cellular account database 141 that tracks the attributes of cellular accounts through which wireless services for a plurality of network IDs are currently provided. One embodiment of cellular account database 141 is described below in conjunction with FIG. 2.

Figure 2:
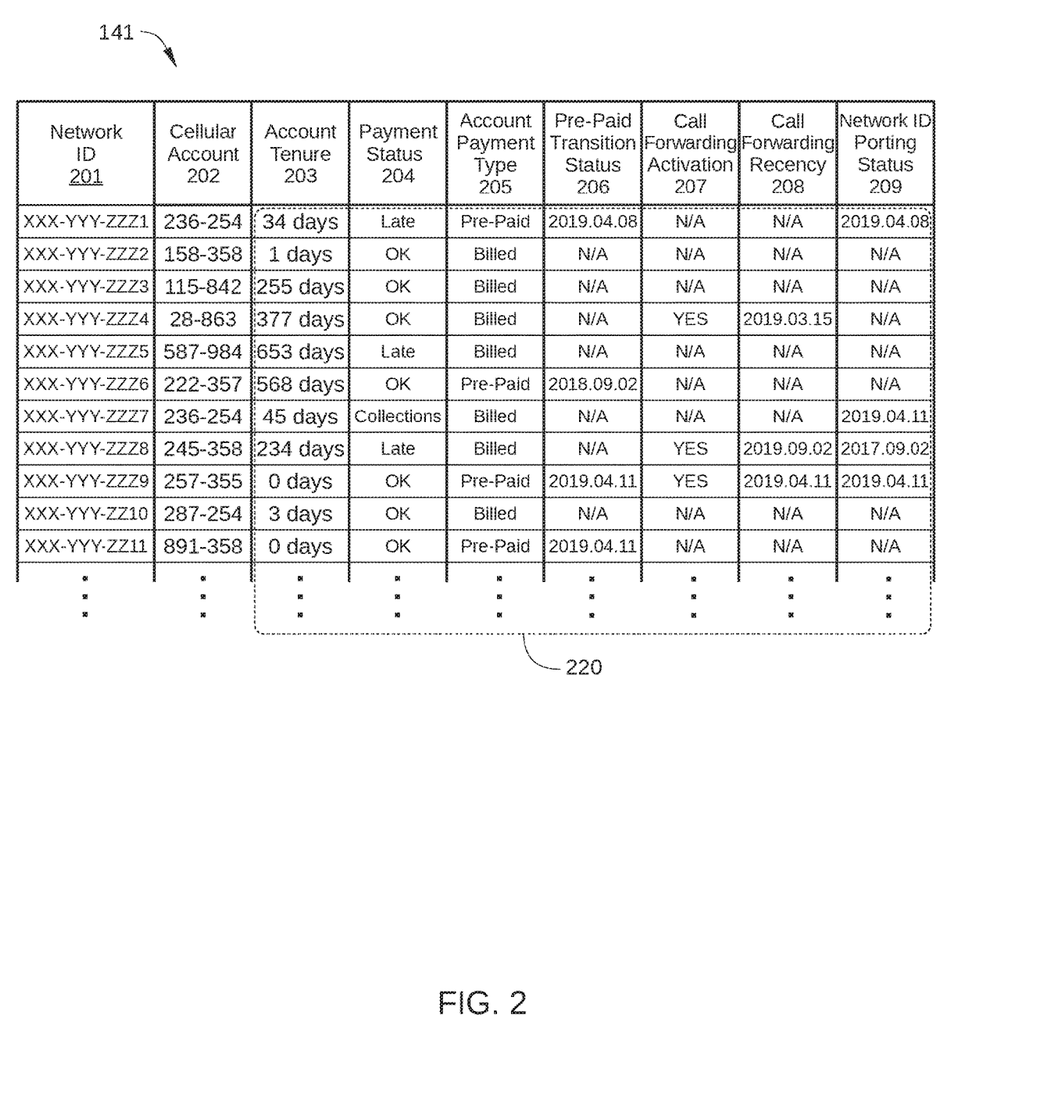
FIG. 2 shows cellular account database, according to one or more embodiments of the present invention.

FIG. 2 shows cellular account database 141, according to one or more embodiments of the present invention. Typically, each cellular network provider 140 maintains a different cellular account database 141 or equivalent thereof, thus, the cellular account database 141 shown in FIG. 2 tracks attributes of cellular accounts for a single cellular network provider 140. In FIG. 2, cellular account database 141 is represented as a table that includes multiple status entries 220 for each of a plurality of cellular accounts 202, where each cellular account 202 is uniquely associated with a single network ID 201. Thus, for each network ID 201, there is a single cellular account 202 through which wireless services for that network ID 201 are currently provided. For each cellular account 202, cellular account database 141 includes a status entry 220 for each of a plurality of different attributes of that cellular account 202.

Examples of suitable account attributes that can be included in cellular account database 141 include account tenure 203 (i.e., how long the cellular account 202 has been activated), payment status 204 (i.e., whether payment for the cellular account is currently overdue, referred for collection, or up-to-date), account payment type 205 (i.e., whether the cellular account is a pre-paid account or a billed account), pre-paid transition status 206, (i.e., whether and how recently the cellular account 202 has transitioned from a billed account to a pre-paid account), call-forwarding activation 207 (i.e., whether call-forwarding is currently activated for the cellular account 202), call-forwarding recency 208 (i.e., how recently call-forwarding was activated for the cellular account 202), network ID porting status 209 (i.e., whether and how recently the associated network ID 201 has been ported from a different cellular account or cellular provider), and the like. In addition to the above-described account attributes, cellular account database 141 can track the status of any other suitable account attributes that in certain instances can indicate possible fraudulent activity associated with the cellular account 202.

By way of illustration, in FIG. 2 cellular account database 141 only tracks the attributes of eleven cellular accounts 202 and associated network IDs 201. In practice, cellular account database 141 can track the attributes of a very large number of cellular accounts 202.

Typically, a particular cellular account 202 can be activated through one of various cellular network providers 140. As a result, in some embodiments, the account attributes of certain cellular accounts 202 reside in a cellular account database 141 for one of cellular network providers 140, while the account attributes of another cellular account 202 reside in a cellular account database 141 for a different one of cellular network providers 140. Thus, in such embodiments, to determine the account attributes of a cellular account 202, application server 130 or risk indicator server 150 queries the cellular network provider 140 in which the specific cellular account 202 resides.

Returning to FIG. 1, risk indicator server 150 may be an application that runs on a server or other computing device coupled to the Internet or other communications network, and is configured to execute risk indicator operations as described herein. Such operations can include tracking/updating changes in information associated with each of a plurality of network IDs and providing the appropriate changes of such information to application server 130 or to another suitable authorization entity. For example, in some embodiments, risk indicator server 150 tracks or updates an information change history and/or a verification query history for each of a plurality of network IDs (mobile telephone numbers).

Alternatively or additionally, in some embodiments, risk indicator operations performed by risk indicator server 150 can include tracking and/or performing a lookup of cellular account status or cellular account attributes for a plurality of network IDs, for example by querying an appropriate cellular network provider 140 for various attributes of each such cellular account. Alternatively or additionally, in some embodiments, such operations can include determining a risk indicator based on changes in information associated with a particular network ID and/or on one or more attributes of a particular cellular account associated with that particular network ID. In such embodiments, risk indicator server 150 is further configured to provide such risk indicators to an application server 130 when requested thereby.

In some embodiments, risk indicator server 150 is further configured to determine whether a transaction (or other access) to server application 130 is an authorized transaction/access or an unauthorized transaction/access based on such risk indicators. In such embodiments, network ID server 150 verifies that changes in information associated with a network ID that can be considered risk indicators have not occurred within a predetermined time period. For example, in some embodiments, risk indicator server 150 maintains a network ID information database 151 that includes previous and current versions of user information for each of a plurality of network IDs for mobile devices. Alternatively or additionally, in some embodiments, network ID information database 151 includes verification query history information associated with each of the plurality of network IDs. Consequently, when a user performs an activity with a mobile device that requires authentication based on a network ID of the mobile device, such as an online access or a person-to-person fund transfer, risk indicators associated with the mobile number can be detected by an authorization entity and acted on accordingly. One embodiment of network ID information database 151 is described below in conjunction with FIG. 3.

Figure 3:
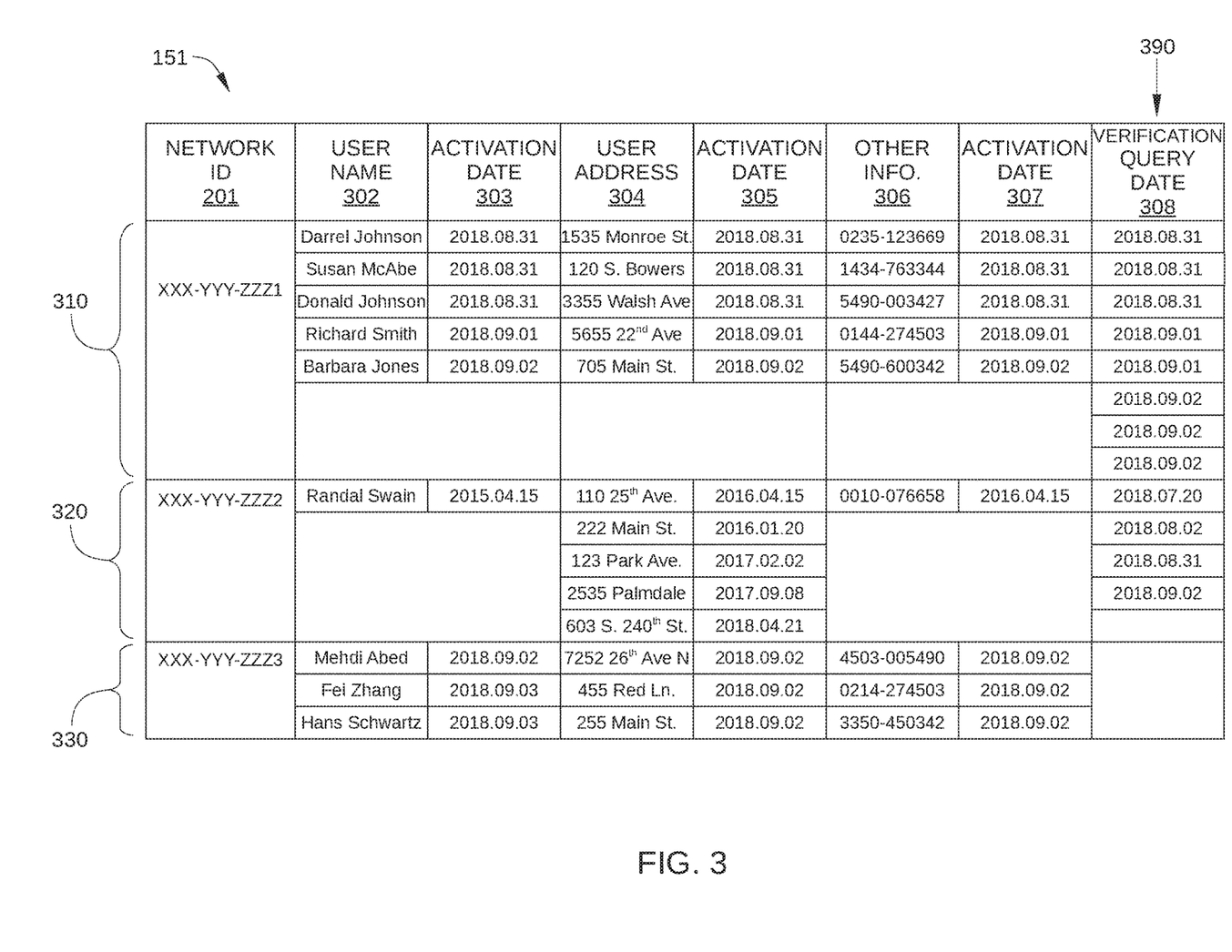
FIG. 3 shows a network ID information database, according to one or more embodiments of the present invention.

FIG. 3 shows network ID information database 151, according to one or more embodiments of the present invention. In FIG. 3, network ID information database 151 is represented as a table that includes previous and current versions of user information for each of a plurality of network IDs 201 and/or a verification query history 390 for each of the plurality of network IDs 201. As shown, network ID information database 151 includes a user information history 310 for mobile number XXX-YYY-ZZZ1, a user information history 320 for mobile number XXX-YYY-ZZZ2, and a user information history 330 for mobile number XXX-YYY-ZZZ3. By way of illustration, in FIG. 3 only three user information histories 310, 320, and 330 are shown, each corresponding to a specific network ID 201. In practice, network ID information database 151 can include a different device history for hundreds of thousands or more of network IDs 201.

Each network ID 201 is an identifier for a mobile device, such as a mobile telephone number, that is provided by a wireless cellular network provider 140, and is associated with a single mobile device 120. It is noted that a particular network ID 201 can be ported to another mobile device 120, and therefore may not be permanently associated with a particular mobile device 120.

Each user information history maps a corresponding network ID 201 to one or more user names 302 and an activation date 303 for each such user name 302. Each user name 302 is a user name that has been associated with that particular network ID 201, for example by a cellular network provider 140. Each activation date 303 indicates a date (or date/time combination) at which the corresponding user name 302 was associated with the network ID 201. Typically, a new user name 302 is associated with a particular network ID 201 when a customer of a cellular network provider 140 opens a mobile account with a new mobile telephone number, and does not port an existing number to the new account. However, a new user name 302 is also associated with a particular network ID 201 when a fraudster opens a mobile account and then adds a potential victim's name to the mobile account. Thus, frequent changes of user name 302 with a particular network ID 201 can indicate that a fraudster is the actual user of the mobile device that is programmed with that network ID 201. By tracking changes of user name 302 with a particular network ID 201 and the activation date 303 for each such user name 302, network ID information database 151 enables detection of potentially fraudulent activity associated with a particular network ID 201. For example, user information history 310 (for mobile number XXX-YYY-ZZZ1) shows many recent changes in user names 302, user addresses 304, and other information 306. In addition, a large number of identity verifications have been tracked for mobile number XXX-YYY-ZZZ1 over a three-day period. Thus, mobile number XXX-YYY-ZZZ1 is likely a network ID that is employed by a fraudster to access victim's accounts.

Alternatively or additionally, in some embodiments, each user information history maps a corresponding network ID 201 to one or more user addresses 304 and an activation date 305 for each such user address 304. Similar to user names 302, each user address 304 is a user address that has been associated with that particular network ID 201, for example by a cellular network provider 140. Each activation date 305 indicates a date (or date/time combination) at which the corresponding user address 304 was associated with the network ID 201. Typically, a new user address 304 is also associated with a particular network ID 201 when a customer of a cellular network provider 140 opens a mobile account with a new mobile telephone number, and does not port an existing number to the new account. Similar to user names 302, a new user address 304 is associated with a particular network ID 201 when a fraudster opens a mobile account and then adds a potential victim's address to the mobile account. Thus, frequent changes of user address 304 with a particular network ID 201 can indicate that a fraudster is the actual user of the mobile device that is programmed with that network ID 201. By tracking changes of user address 304 associated with a particular network ID 201 and the activation date 305 for each such user address 304, network ID information database 151 enables detection of potentially fraudulent activity associated with a particular network ID 201.

Alternatively or additionally, in some embodiments, each user information history maps a corresponding network ID 201 to other user information 306 and an activation date 307 for each instance in which that user information 306 for the network ID 201 is updated. Examples of other user information 306 include bank account information associated with the network ID 201, cellular network provider information associated with the network ID 201, and/or any other suitable user-specific information that may be associated with network ID 201.

Alternatively or additionally, in some embodiments, each user information history maps a corresponding network ID 201 to a verification query history 390 that includes one or more verification query dates 308 that indicate a date or date/time that an identity verification query has been performed associated with that particular network ID 201. Frequent and/or repeated identity verification queries for a single network ID 201 are generally associated with a fraudster attempting to penetrate security for accounts that have been associated with that network ID 201. Thus, by tracking verification query dates 308 with a particular network ID 201, network ID information database 151 enables detection of potentially fraudulent activity associate with a particular network ID 201.

In some embodiments, network ID information database 151 can include user information across multiple cellular network providers 140. This is because risk indicator server 150 generally receives identity verification queries that can reference a mobile device 120 that is associated with any of a plurality of different cellular network providers 140.

Returning to FIG. 1, destination mobile device 160 may be a mobile device (or other computing device) that receives information from application server 130 as part of a transaction or other interaction initiated by mobile device 120. For example, in some embodiments, destination mobile device 160 is a mobile device that receives fund transfer information 101 from application server 130 as part of a person-to-person fund transfer from an account associated with application server 130, where the user of computing device 110 (or mobile device 120) initiates the person-to-person fund transfer. When the person-to-person fund transfer is determined to be an authorized interaction by a suitable authorization entity (e.g., application server 130 and/or risk indicator server 150), application server 130 transmits fund retrieval information 101, such as a web link, to destination mobile device 160. The web link or other fund retrieval information 101 may be contained in an e-mail, a short message service (SMS) text message, and the like. Destination mobile device 160 can be any suitable computing device. When destination mobile device 160 is a mobile device, mobile device 160 may be configured similarly to mobile device 120, and include a processor, a wireless communication module, a memory, etc.

Figure 4:
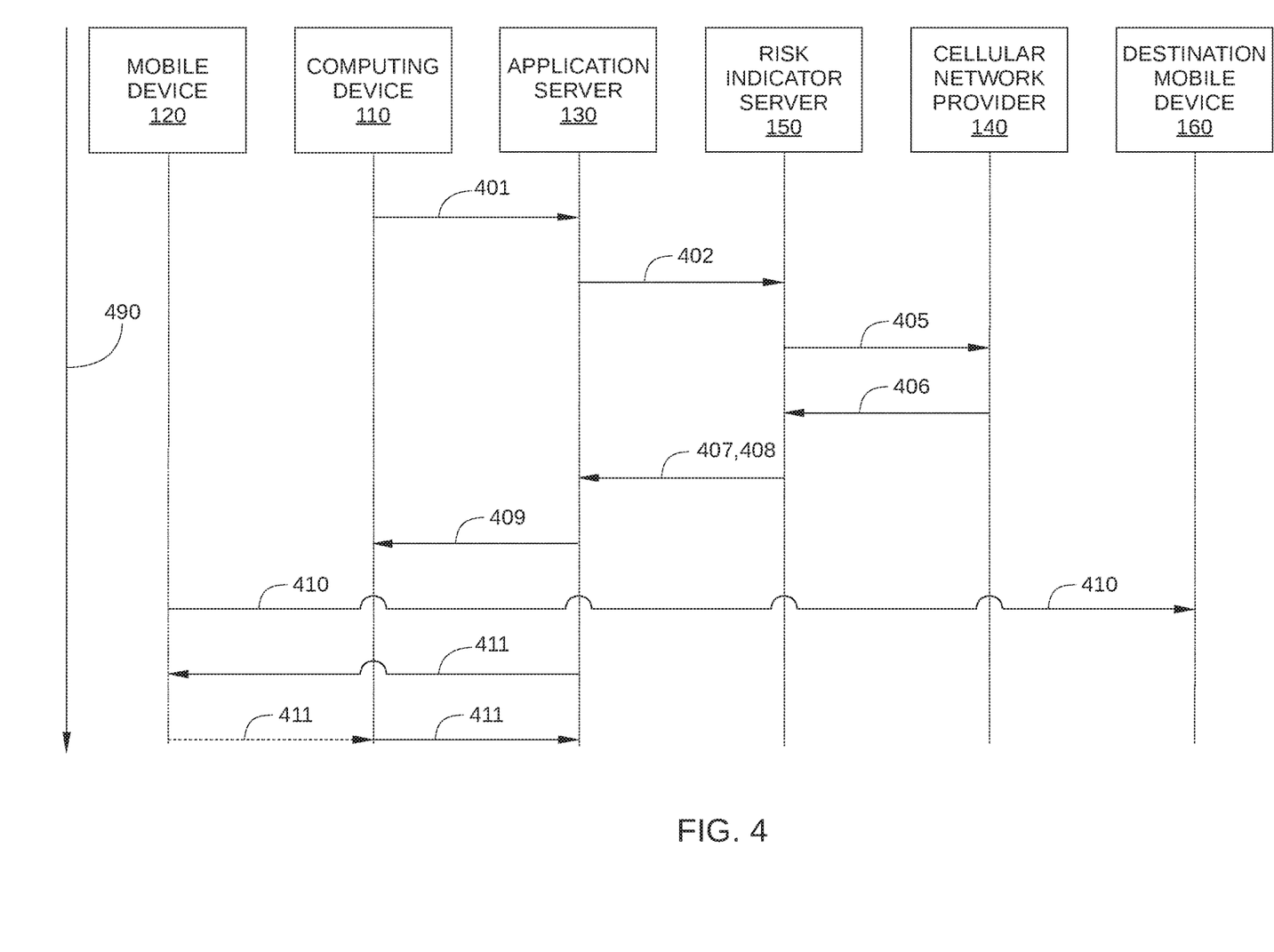
FIG. 4 schematically illustrates the steps performed by the wireless communication system of FIG. 1 as the steps occur sequentially along a time line, according to one or more embodiments of the invention.

FIG. 4 schematically illustrates the steps performed by mobile identity verification system 100 as the steps occur sequentially along a time line 490, according to one or more embodiments of the invention. As noted above, when a user attempts to access a restricted-access account associated with application server 130 (or otherwise initiate a sensitive transaction with application server 130) via a computing device 110, and possession of a mobile device 120 programmed with a network ID is an authentication factor for such an access, risk indicator server 150 provides to application server 130 a history of changes to information associated with the network ID or a risk indicator based on such changes to information. In addition, risk indicator server 150 provides to application server 130 one or more attributes of a cellular account associated with the network ID or a risk indicator based on such attributes.

In such embodiments, application server 130 can then determine whether to authorize the access by calculating a risk score based on the risk indicators. Alternatively, in some embodiments, risk indicator server 150 calculates such a risk score, determines whether to authorize the access based on the risk score, and provides to application server 130 an authorization of the network ID to perform the sensitive transaction. Thus, in such embodiments, risk indicator server 150 is configured to determine whether to authorize the access instead of application server 130.

When a user attempts to initiate an online transaction or otherwise interact with application server 130, computing device 110 transmits a login request 401 to application server 130 in order to login or otherwise access application server 130. For example, after a connection is established between computing device 110 and application server 130 via communication network 108, a user may select an icon displayed by computing device 110 to initiate login request 401. The icon may be displayed by, for example, vendor application 115 or web browser 116 running on computing device 110. In embodiments in which the computing device by which the user attempts to interact with application server 130 is mobile device 120, the icon may be displayed by, for example, web browser 126 running on mobile device 120. In some embodiments, the network ID 201 of mobile device 120 is included in login request 401.

In some embodiments, login request 401 initiates authorization of a user activity that employs the network ID of mobile device 120 as an authentication factor by providing applicable risk indicators associated with the network ID to application server 130 (or to another suitable authorization entity). In some embodiments, login request 401 initiates authorization, based on certain risk indicators, for establishing a mobile device programmed with the network ID as an authorized device for receiving funds from a restricted-access account on application server. In such embodiments, successful completion of the authorization results in the mobile device programmed with the network ID being established as an authorized mobile device for receiving funds from the restricted-access account. In some embodiments, login request 401 initiates a verification process which, if successfully completed, enables application server 130 to initiate a person-to-person fund transfer from an account associated with application server 130 to the mobile device programmed with the network ID. In such embodiments, the verification process is based on certain risk indicators as described herein. In some embodiments, login request 401 initiates authorization for establishing a restricted-access account on application server 130 that is linked to the network ID.

Application server 130 then transmits a request for authorization information 402 to risk indicator server 150 for the network ID programmed on the mobile device 120 associated with the account referenced in login request 401. Request for authorization information 402 generally includes user information associated with the restricted-access account that mobile device 120 is attempting to access or interact with. For example, request for authorization information 402 may include a user name and/or a user address for the restricted-access account, and/or other information associated with the restricted-access account.

In embodiments in which login request 401 includes the network ID activated on mobile device 120, such as when cellular network provider 140 includes the network ID in header information of data traffic associated with login request 401, application server 130 extracts the network ID from login request 401 in an appropriate procedure. In embodiments in which login request 401 does not explicitly include the network ID activated on mobile device 120, application server 130 can query a cellular network provider 140 associated with wireless communication network 108 for the network ID based on an Internet Protocol (IP) address included in login request 401. Alternatively, in such embodiments, application server 130 can query a mobile device identification server for the network ID based on the IP address included in login request 401. One example of such a mobile device identification server is described in detail in U.S. patent application Ser. No. 16/102,624, filed Aug. 13, 2018 and entitled "Mobile Number Verification for Mobile Network-Based Authentication," which is incorporated herein by reference in its entirety.

Upon receipt of request for risk indicators 402 from application server 130, risk indicator server 150 determines one or more risk indicators for the network ID included in request for risk indicators 402, then transmits the appropriate risk indicators 407 to application server 130.

In some embodiments, to determine some risk indicators, risk indicator server 150 determines whether information associated with the network ID of interest exists in network ID information database 151, and whether such information has changed within a predetermined time interval. The time interval can be of any suitable duration (e.g., hours, days, or longer), and there can be different time intervals for different categories of information that has changed. For example, several changes in one week for user name 302 or user address 304 (see FIG. 3) for a particular network ID 201 may be considered a risk indicator, while several verification queries occurring within a single week for one particular network ID 201 may not be considered a risk indicator. Risk indicator server 150 then determines one or more risk indicators based on changes of information associated with the network ID of interest. Any suitable algorithm can be employed to generate the one or more risk indicators.

In some embodiments, to determine some risk indicators, risk indicator server 150 queries the appropriate cellular network provider 140 for one or more attributes of the cellular account 302 through which wireless services for the network ID 201 are currently provided. For example, in an embodiment, risk indicator server 150 transmits an account attributes query 405 to the appropriate cellular network provider 140.

After determining whether information associated with the network ID of interest has changed within a predetermined time interval and receiving account attributes 406 from the appropriate cellular network provider 140, risk indicator server 150 returns risk indicators 407 to application server 130. In some embodiments, risk indicators 407 include one or more change indicators and/or account attributes 406. The change indicators each inform application server 130 of a specific change of information associated with the network ID of interest in network ID information database 151. In such embodiments, instead of risk indicator server 150, application server 130 is configured to determine whether the current user activity associated with login request 401 is authorized based on the specific changes of information (or lack thereof) within a predetermined time interval of information associated with the network ID. Thus, application server 130 employs the one or more specific changes of information associated with the network ID and/or one or more account attributes 406 as risk indicators for the network ID.

Some examples of changes of information that may be indicated in risk indicators 407 are a change of user name, a change of user address, a verification query history (in which a number of identity verification queries within a certain time interval has changed), and the like. An example of an account attribute 406 that is a potential indicator of fraudulent activity is a cellular account 302 that has been recently activated (e.g., within the last 24 hours or 72 hours, since a fraudster porting a victim's network ID to an account controlled by the fraudster generally involves the activation of a new cellular account 302. In another example, a cellular account 302 that has an overdue payment and/or has been referred for collection can indicate an account that is not intended to be used further, and may be employed by a fraudster in lieu of opening a new account. In another example, a cellular account 302 that is a pre-paid account is a potential indicator of fraudulent activity, since fraudsters typically employ pre-paid accounts when porting a victim's network ID 201 to an account controlled by the fraudster. In another example, a cellular account 302 that has recently transitioned to a being a pre-paid account is a potential indicator of fraudulent activity, since fraudsters typically employ a particular pre-paid account for fraudulent activity for a short time before deactivating the account. In another example, a cellular account 302 that has call-forwarding activated is a potential indicator of fraudulent activity, since fraudsters sometimes employ call-forwarding from a victim's mobile device to a mobile device controlled by the fraudster to intercept an OTP. In another example, a cellular account 302 that has recently had the network ID 201 ported thereto is a potential indicator of fraudulent activity, since fraudsters often attempt to port a victim's network ID to cellular account 302 controlled by the fraudster.

Alternatively, in some embodiments, risk indicator server 150 returns an authorization notification 408 instead of risk indicators 407, where authorization notification 408 indicates that the network ID of interest is either authorized or not authorized to initiate login request 401. In such embodiments, risk indicator server 150 is configured to determine whether the current user activity associated with login request 401 is authorized based on the changes (or lack thereof) within a predetermined time interval of information associated with the network ID, and whether the account attributes 406 of the cellular account 302 associated with network ID 201 are risk indicators.

In embodiments in which risk indicator server 150 returns risk indicators 407 to application server 130, application server 180 determines a risk score for the specified network ID 201 based on risk indicators 407. Based on the risk score, application server 130 determines whether the requested user activity is authorized. If the risk score is below a predetermined threshold, the user of that computing device 110 can interact with application server 130 normally; if the risk score exceeds the predetermined threshold, application server 130 prevents mobile device 120 from performing the current user activity with respect to application server 130. Thus, based on the risk indicators that are detected, or on the lack of detected risk indicators, application server 130 determines whether the user activity associated with login request 401 is authorized In some embodiments, based on risk indicators 407 or authorization notification 408, application server 130 then transmits a login request response 409 to computing device 110, indicating whether or not the requested user activity is authorized. If yes, the user of that computing device 110 can interact with application server 130 normally; if no, application server 130 prevents mobile device 120 from performing the current user activity with respect to application server 130. Thus, when the user activity is to request establishing a restricted-access account on application server 130, application server 130 determines a risk score based on the above-described risk indicators and, when appropriate, establishes the restricted-access account on the application server 130. Similarly, when the user activity is to request registration of a network ID 201 as an identifier of a mobile device 120 for a restricted-access account on application server 130, such as a mobile device that is authorized to receive a funds transfer from the restricted-access account, application server 130 determines a risk score based on the above-described risk indicators. When appropriate, application server 130 then registers the network ID as the identifier of the authorized device for receiving funds from the restricted-access account. Further, when the user activity is to transmit a fund retrieval notification to a destination mobile device 160, application server 130 determines a risk score based on the above-described risk indicators and, when appropriate, transmits the fund retrieval notification to the mobile device that is programmed with the network ID.

In some embodiments, based on risk indicators 407 or authorization notification 408, application server 130 may perform other actions when login request 401 is determined to be an authorized request. For example, when login request 401 initiates a person-to-person funds transfer, application server 130 may transmit fund retrieval information 410 to destination mobile device 160.

In some embodiments, in response to authorization notification 408 indicating that the requested user activity is authorized or application server 130 determines that the requested user activity is authorized, application server 130 transmits an OTP 411 or other pass code to the mobile device 120 programmed with the network ID for which changes of associated information have been checked. In such embodiments, transmission of OTP 411 enables verification of possession of mobile device 120 by the user requesting the user activity. Specifically, when the user requesting the user activity is in possession of that mobile device 120, the user receives OTP 411 via mobile device 120, and enters OTP 411 in an appropriate manner, for example via a pop-up window or dialogue box displayed by vendor application 115 or web browser 116. OTP 411 is then transmitted to application server 130. Upon receipt of OTP 411 from computing device 110, the user of computing device 110 can interact with application server 130 normally.

By performing the steps in FIG. 4, mobile identity verification system 100 enhances the security of using a network ID as a possession factor for a particular mobile device 120, since suspicious activity associated with that network ID can be detected prior to authorizing a user activity with that network ID.

In the embodiments described above, risk indicator server 150 maintains and updates network ID information database 151. Alternatively, in some embodiments, some or all of the information included in network ID information database 151 of FIG. 2 can be maintained and updated by application server 130. In such embodiments, application server 130 performs some or all of the operations described above performed by risk indicator server 150.

Figure 5:
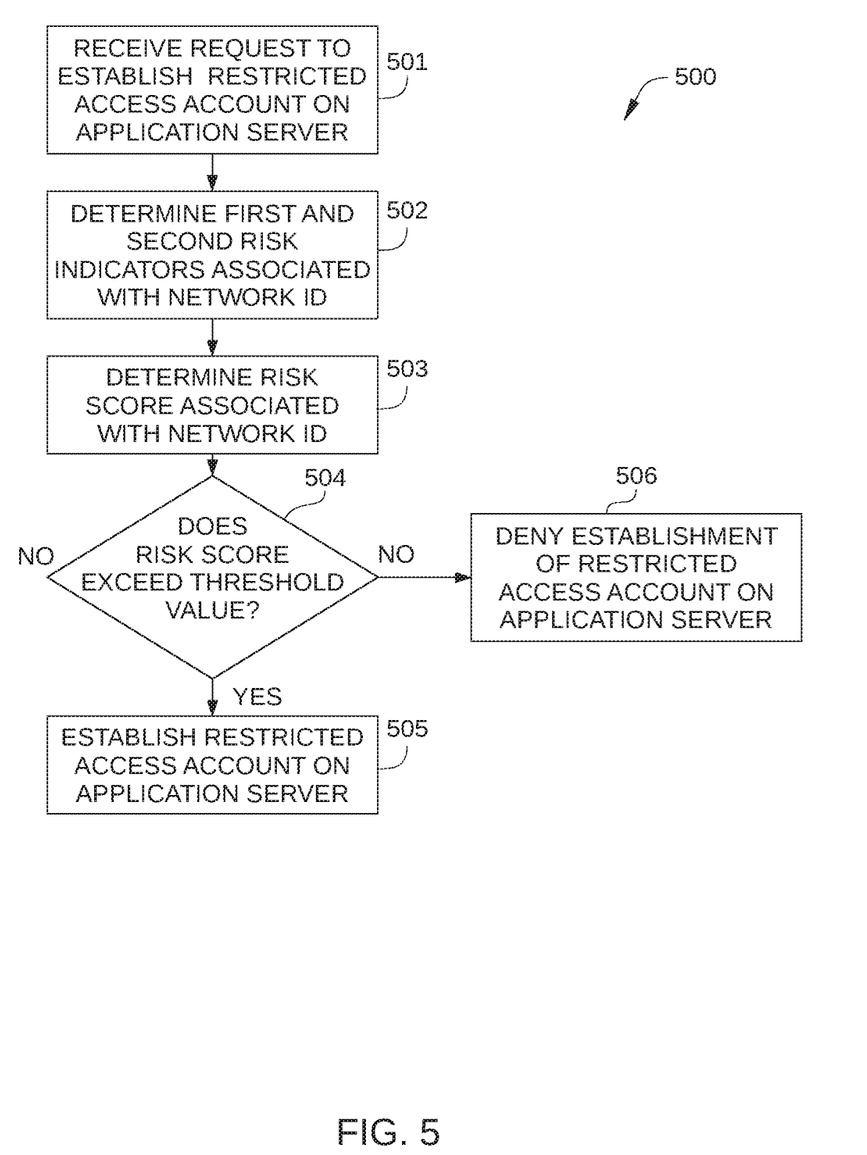
FIG. 5 is a flowchart of method steps for establishing a restricted-access account on an application server, according to one or more embodiments of the invention.

FIG. 5 is a flowchart of method steps for establishing a restricted-access account on an application server, according to one or more embodiments of the invention. Although the method steps are described in conjunction with mobile identity verification system 100 of FIG. 1, persons skilled in the art will understand that the method steps may be performed with other suitable mobile identity verification systems.

As shown, a method 500 begins at step 501, where application server 130 receives a request from computing device 110 to establish a restricted-access account on application server 130. For example, the request may be included in a login request 401.

In step 502, application server 130 determines first and second risk indicators. The first risk indicator is based on whether or not there is a change of information associated with the network ID during a predetermined time interval and the second risk indicator is based on at least one attribute of a cellular account that is currently associated with the network ID. In some embodiments, determining the first risk indicator for the network ID comprises transmitting a query for the change of information associated with the network ID to a risk indicator monitoring server (such as risk indicator server 150) configured to detect whether or not there is a change of information associated with the network ID during the predetermined time interval. In some embodiments, determining the second risk indicator for the network ID comprises transmitting a query for at least one attribute of the cellular account to a cellular network provider associated with the cellular account; and receiving the at least one attribute from the cellular network provider. In some embodiments, the risk indicator monitoring server transmits the query to the cellular network provider, and in other embodiments application server risk 130 may transmit the query directly.

In step 503, application server 130 or risk indicator server 150 determines the risk score associated with the network ID referenced in request for login request 401.

In step 504, application server 130 or risk indicator server 150 determines whether the risk score so determined exceeds a predetermined threshold. If yes, method 500 proceeds to step 505; if no, method 500 proceeds to step 506.

In step 505, application server 130 establishes the restricted-access account on application server 130.

In step 506, application server 130 denies establishment of the restricted-access account on application server 130. In some embodiments, application server 130 also transmits a denial or other error message to the computing device 110 that originated request for login request 401.

Figure 6:
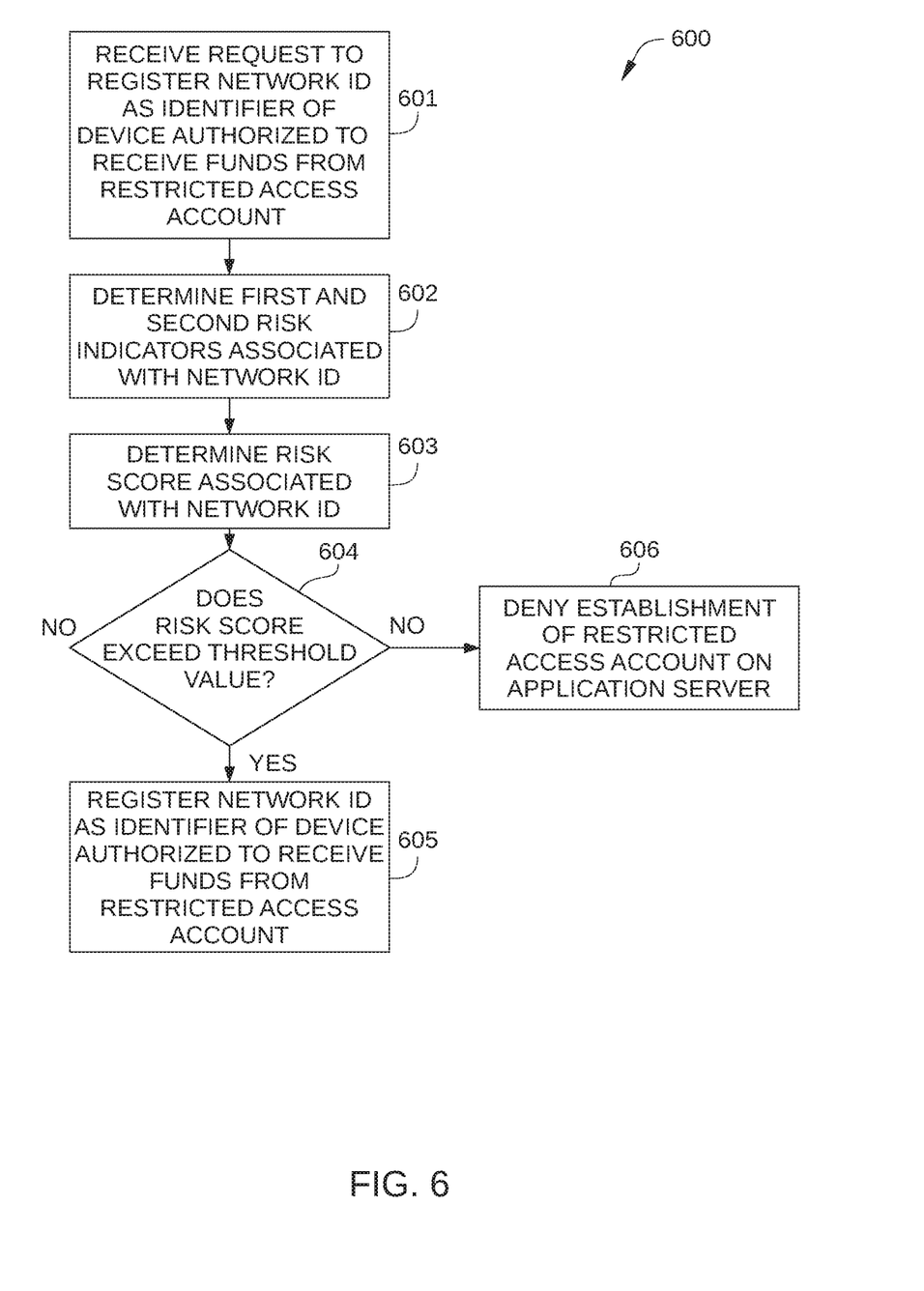
FIG. 6 is a flowchart of method steps for establishing a mobile device as an authorized device for receiving funds from a restricted-access account on an application server, according to one or more embodiments of the invention.

FIG. 6 is a flowchart of method steps for establishing a mobile device as an authorized device for receiving funds from a restricted-access account on an application server, according to one or more embodiments of the invention. Although the method steps are described in conjunction with mobile identity verification system 100 of FIG. 1, persons skilled in the art will understand that the method steps may be performed with other suitable mobile identity verification systems.

As shown, a method 600 begins at step 601, where application server 130 receives a request (e.g., request for risk indicators 402) from computing device 110 to register a network identification (ID) as an identifier of the mobile device for a specified network ID, for example from computing device 110. Specifically, the request is for the network ID to be registered as an authorized device for receiving funds from a restricted-access account, for example by the mobile device receiving a fund retrieval notification.

In step 602, application server 130 determines first and second risk indicators. The first risk indicator is based on whether or not there is a change of information associated with the network ID during a predetermined time interval and the second risk indicator is based on at least one attribute of a cellular account that is currently associated with the network ID. In some embodiments, determining the first risk indicator for the network ID comprises transmitting a query for the change of information associated with the network ID to a risk indicator monitoring server (such as risk indicator server 150) configured to detect whether or not there is a change of information associated with the network ID during the predetermined time interval. In some embodiments, determining the second risk indicator for the network ID comprises transmitting a query for at least one attribute of the cellular account to a cellular network provider associated with the cellular account; and receiving the at least one attribute from the cellular network provider. In some embodiments, the risk indicator monitoring server transmits the query to the cellular network provider, and in other embodiments application server risk 130 may transmit the query directly.

In step 603, application server 130 or risk indicator server 150 determines the risk score associated with the network ID referenced in request for risk indicators 402.

In step 604, application server 130 or risk indicator server 150 determines whether the risk score so determined exceeds a predetermined threshold. If yes, method 600 proceeds to step 605; if no, method 600 proceeds to step 606.

In step 605, application server 130 registers the network ID as the identifier of a mobile device as an authorized device for receiving funds from the restricted-access account on application server 130.

In step 606, application server 130 denies registration of the network ID on application server 130. In some embodiments, application server 130 also transmits a denial or other error message to the computing device 110 that originated request for risk indicators 402.

In sum, embodiments described herein enable a network ID of a mobile device to be securely employed as a possession factor or as an identifier of a mobile device that is authorized to receive a funds transfer. Consequently, the embodiments provide a technical solution to the problem of a fraudster being able to open a mobile account in the name of a potential victim and use the network ID associated with that account as an authentication factor. Specifically, when an access to a restricted access application server or a restricted access account on the application server is attempted via a computing device, and possession of a mobile device programmed with a network ID is employed as a verification factor, an authorization entity (e.g., the application server or a network ID monitoring server) can determine whether certain information associated with the network ID has been changed within a predetermined time interval and whether one or more attributes of a cellular account associated with the network ID are risk indicators. Such changes and account attributes can indicate potentially fraudulent activity. Based on the risk indicators associated with the network ID, access to the restricted access application server is either authorized or denied.

While the foregoing is directed to embodiments of the present invention, other and further embodiments of the invention may be devised without departing from the basic scope thereof, and the scope thereof is determined by the claims that follow.

We claim:

1. A computer-implemented method of authorizing a user activity based on a mobile device on which a network identification (ID) has been activated, the method comprising:
   receiving a request from a computing device to establish a restricted-access account on an application server, wherein the request references the network ID;
   determining a risk score based on a first risk indicator for the network ID and a second risk indicator for the network ID, wherein the first risk indicator is based on whether or not there is a change of information associated with the network ID during a predetermined time interval and the second risk indicator is based on at least one attribute of a cellular account that is currently associated with the network ID; and
   upon determining that the risk score is below a threshold, establishing the restricted-access account on the application server,
   wherein the application server is configured to employ the network ID as an authentication factor for subsequent access to the restricted-access account.

2. The computer-implemented method of claim 1, wherein the change of information associated with the network ID includes one or more of a change in a name for a mobile account associated with the network ID, a change in an address for a mobile account associated with the network ID, and a change in a number of identity verification queries associated with the network ID that have occurred during the predetermined time interval.

3. The computer-implemented method of claim 1, wherein the request from the computing device includes at least one of a user name associated with the restricted-access account, a user address associated with the restricted-access account, and the network identification ID.

4. The computer-implemented method of claim 1, wherein determining the first risk indicator for the network ID comprises transmitting a query for the change of information associated with the network ID to a network ID monitoring server configured to detect whether or not there is the change of information associated with the network ID during the predetermined time interval.

5. The computer-implemented method of claim 1, wherein determining the second risk indicator for the network ID comprises:
   transmitting a query for at least one attribute of the cellular account to a cellular network provider associated with the cellular account; and
   receiving the at least one attribute from the cellular network provider.

6. The computer-implemented method of claim 1, wherein determining the risk score comprises transmitting a query to a network ID monitoring server for the risk score.

7. A computer-implemented method of establishing a mobile device as an authorized device for receiving funds from a restricted-access account on an application server, the method comprising:
   receiving a request from a computing device to register with the restricted-access account a network identification (ID) as an identifier of the mobile device;
   determining a risk score based on a first risk indicator for the network ID and a second risk indicator for the network ID, wherein the first risk indicator is based on whether or not there is a change of information associated with the network ID during a predetermined time interval and the second risk indicator is based on at least one attribute of a cellular account that is currently associated with the network ID; and
   upon determining that the risk score is below a threshold, registering the network ID as the identifier of the mobile device as the authorized device for receiving funds from the restricted-access account.

8. The computer-implemented method of claim 7, further comprising:
   prior to receiving the request from the computing device to register the network ID, receiving a request from the computing device to access the restricted-access account; and
   in response to receiving the request, allowing the computing device to access the restricted-access account.

9. The computer-implemented method of claim 8, wherein the request from the computing device to access the restricted-access account includes an authentication factor for the restricted-access account.

10. The computer-implemented method of claim 7, further comprising:
    after registering the network ID as the identifier of the mobile device, receiving a request to initiate transmission of a fund retrieval notification to a destination mobile device on which the network ID has been activated; and
    transmitting the fund retrieval notification to the destination mobile device,
    wherein the fund retrieval notification, when received by the destination mobile device, enables a transfer of funds from the restricted-access account.

11. The computer-implemented method of claim 7, further comprising:
    querying a network ID monitoring server for the change of information associated with the network ID; and
    determining a value for the first risk indicator.

12. The computer-implemented method of claim 7, further comprising querying a network ID monitoring server for a value for the first risk indicator.

13. The computer-implemented method of claim 7, wherein determining the second risk indicator for the network ID comprises:
    transmitting a query for at least one attribute of the cellular account to a cellular network provider associated with the cellular account; and
    receiving the at least one attribute from the cellular network provider.

14. A computer-implemented method of authorizing a user activity based on a network identification (ID) of a mobile device, that has been activated, the method comprising:
    receiving a request from a computing device to initiate transmission of a fund retrieval notification to a destination mobile device from a restricted-access account on an application server, wherein the request references the network ID and the fund retrieval notification, when received by the destination mobile device, enables a transfer of funds from the restricted-access account;
    determining a risk score based on a first risk indicator for the network ID and a second risk indicator for the network ID, wherein the first risk indicator is based on whether or not there is a change of information associated with the network ID during a predetermined time interval and the second risk indicator is based on at least one attribute of a cellular account that is currently associated with the network ID; and upon determining that the risk score is below a threshold, transmitting the fund retrieval notification to the destination mobile device.

15. The computer-implemented method of claim 14, further comprising:
  prior to receiving the request from the computing device to access the restricted-access account, receiving a request from the computing device to access the restricted-access account; and
  in response to receiving the request, allowing the computing device to access the restricted-access account.

16. The computer-implemented method of claim 14, further comprising:
  querying a network ID monitoring server for the change of information associated with the network ID; and
  determining a value for the first risk indicator.

17. The computer-implemented method of claim 14, further comprising querying a network ID monitoring server for a value for the first risk indicator.

18. The computer-implemented method of claim 14, wherein determining the second risk indicator for the network ID comprises:
  transmitting a query for at least one attribute of the cellular account to a cellular network provider associated with the cellular account; and
  receiving the at least one attribute from the cellular network provider.

19. The computer-implemented method of claim 14, wherein determining the risk score comprises transmitting a query to a network ID monitoring server for the risk score.

* * * * *